United States Patent Office 3,441,334
Patented Apr. 29, 1969

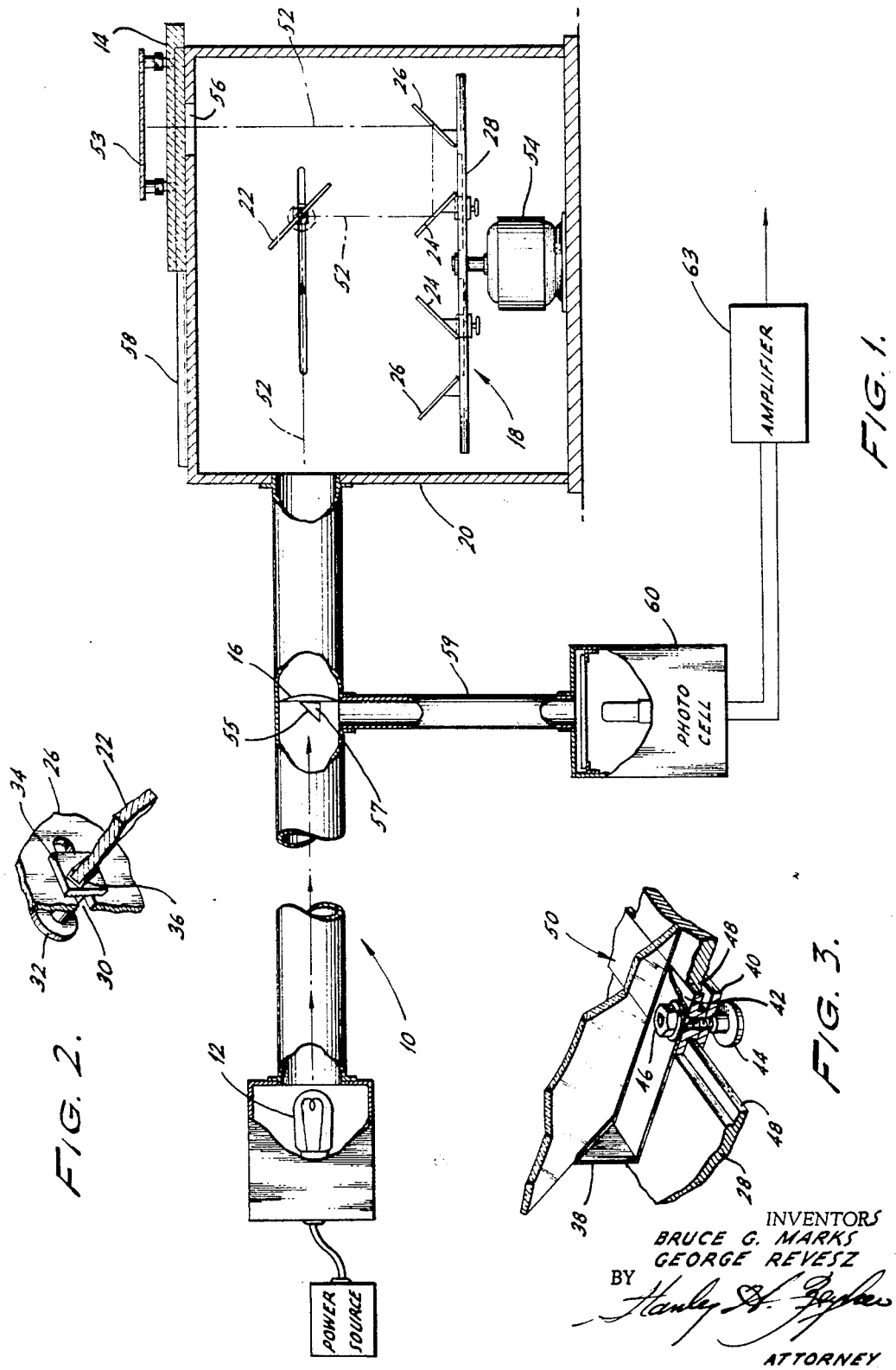

3,441,334
NON-CIRCULAR ROTARY SCANNING MEANS
Bruce G. Marks, Lansdale, and George Revesz, Bala Cynwyd, Pa., assignors to Philco-Ford Corporation, Philadelphia, Pa., a corporation of Delaware
Filed May 21, 1965, Ser. No. 457,725
Int. Cl. G02b *17/00;* H04n *3/00;* G01n *21/30*
U.S. Cl. 350—7                                         3 Claims

ABSTRACT OF THE DISCLOSURE

Rotatable scanning means for achieving non-circular scanning comprising a pair of confronting, plane reflecting surfaces carried by rotatable support structure and positioned in reflective alignment and in angular relation to the plane of rotation and in predetermined spaced relationship from each other and from the rotational axis of said structure, and means for focusing radiation onto one or the other of said surfaces for reflection thereof by the other of said surfaces and productive upon rotation of said surfaces, of a non-circular trace.

---

This invention relates to the mechanical scanning art and more particularly to novel and improved apparatus for linearizing the scanning trace of rotary scanning apparatus.

Techniques currently employed in an attempt to achieve linearity of scan in such apparatus involve either intricate optical means or complex mechanical devices. One form of device based on well-known Nipkow scanning principles makes use of synchronously rotatable discs precision apertured to produce, through their coordinate action, an approximately straight-line scanning trace. In instances when large areas are to be scanned these latter arrangements require discs of inordinate size. Moreover, to resolve minute detail using such devices requires a precision of manufacture which is prohibitive.

Scanners utilizing rotatable discs suffer from the further deficiency that the scanning spot varies in size throughout each scanning traverse resulting in a system of variable sensitivity and impaired definition. Another disadvantage inherent in the use of disc type scanning devices is the resulting variation in traversing speed. The linear velocity of traverse is lower in the intermediate portion of the scan than at the end, resulting in distortion of the displayed image.

It is an object of this invention to provide scanning apparatus which overcomes the deficiencies and limitations of the prior art.

Another object of the invention is the provision of rotary scanning apparatus of simplified and inexpensive construction capable of producing substantially straight-line scan.

It is a further object of the invention to provide scanning apparatus capable of producing a scanning beam, or area of discovery, which is of constant cross sectional area during traverse.

A still further and more particularized object of the invention is the provision of scanning apparatus of constant focal length permitting use of radiation-detecting means positioned in fixed relation to the scanning path.

These and other objects within contemplation will be more readily understood by reference to the accompanying detailed description and drawings, in which:

FIGURE 1 is a partially sectionalized view of apparatus embodying features of the invention;

FIGURES 2 and 3 are enlarged details of portions of the scanning apparatus illustrated in FIGURE 1;

The invention resides primarily in the discovery that linearized scan can be achieved through use of a pair of confronting, plane reflecting surfaces positioned in predetermined spaced relationship on rotatable support structure. We have observed that if a pair of reflecting surfaces are disposed in confronting radial alignment on a rotatable table, and each is positioned outboard of the rotational axis of the table, that on rotation of the table radiation from a fixed source incident on the innermost one of said surfaces results in generation, by radiation reflected from the outermost of said surfaces, of a scanning trace the configuration of which is dependent on the geometric orientation and relative spacing of the surfaces.

By way of illustration let it be assumed, for example, that a pair of plane mirrors are arranged in confronting optical alignment on a horizontal, rotatable table, and each is positioned at a 45° angle to the vertical so that between them they subtend a right angle. When the innermost mirror is arranged to receive incident radiation along a path coincident with the axis of rotation of the table, it will be apparent that the scanning trace produced by reflection of radiation by the outermost mirror, on rotation of the table, will be the arc of a circle whose radius is equal to the distance between the axis of rotation and the point of reflection on the second rotating mirror. It has been discovered that as the innermost mirror is moved along a radial line toward the outermost mirror, the scanning trace becomes more nearly linear. Continued movement of the innermost mirror past a given critical position results in generation of a curved scanning trace whose curvature is the inverse of that produced before the critical position is reached.

Figures 4, 4A:
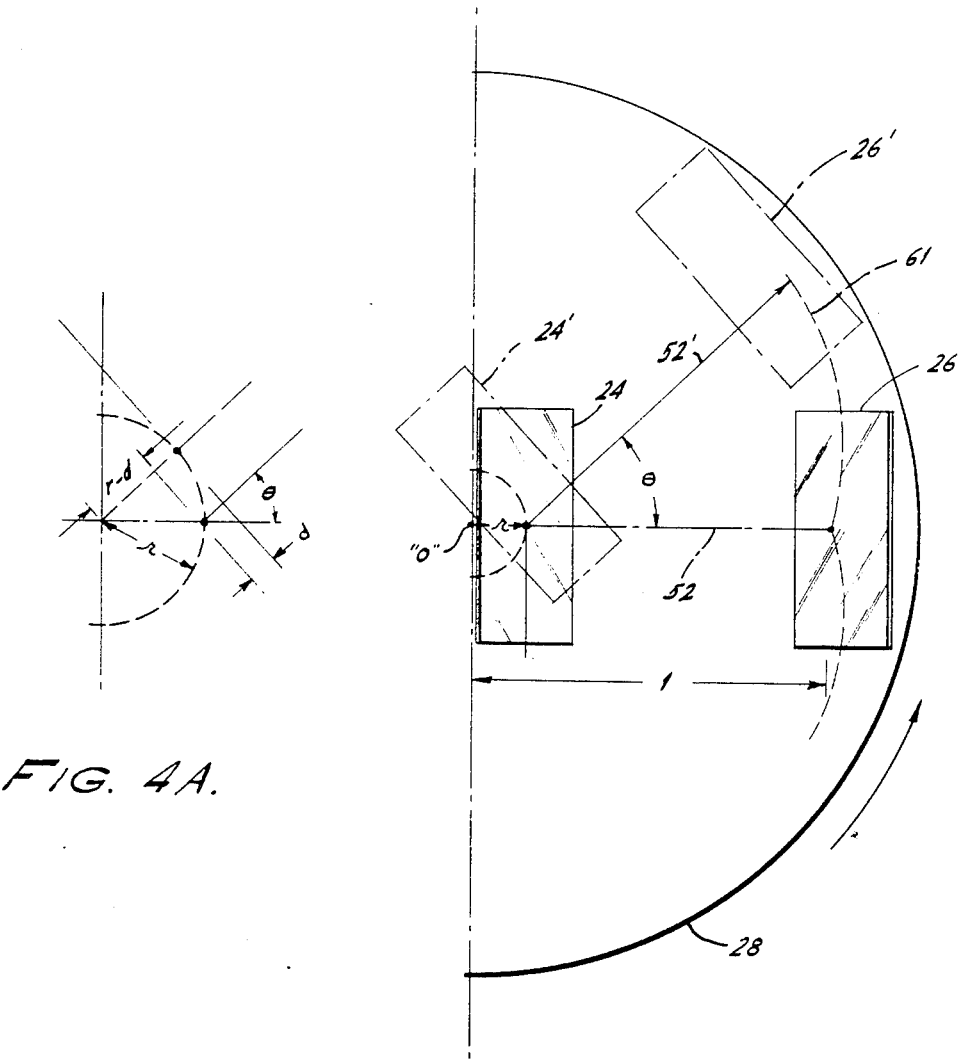
FIGURE 4 is a plan view of the rotary scanner shown in FIGURE 1.
FIGURE 4A is an enlarged showing of a central portion of the apparatus shown in FIGURE 4.
Figure 5:
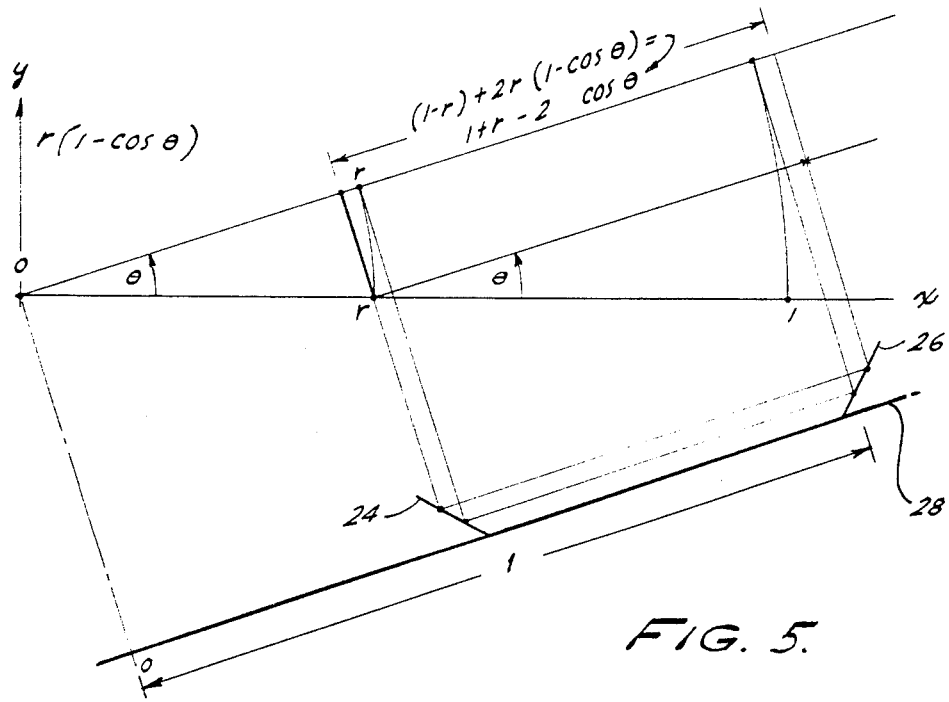
FIGURE 5 is a diagram illustrating the geometry underlying the invention.

If the distance from the axis of rotation "0" to the point of reflection on the outermost mirror is unity, see FIGURES 4 and 5, the distance $r$ from the center of rotation to the point of reflection on the innermost mirror is defined by the expression:

$$r = \frac{1-\cos\theta}{1+\cos\theta - 2\cos^2\theta} \qquad (1)$$

where theta is the angle of traverse. As will be shown later, maximum linearity of scan is achieved when the value of $r$ is approximately one-third of the distance from the axis of rotation to point of reflection on the outermost mirror.

It will be appreciated that there are a plurality of uses to which a rotary scanner capable of producing substantially straight-line scan can be put. To name a few of such applications, it may be used in connection with flaw detection apparatus of the type illustrated in FIGURE 1, or in association with facsimile reproduction equipment for scanning intelligence into video information, or as the light traversing system of a flying spot scanner.

Referring to FIGURE 1 the scanner is shown embodied in inspection apparatus 10 designed for use in the detection of flaws in transparent sheet material such as glass. The radiation source for the system is a conventional zirconium arc lamp 12 which provides a concentrated spot source of radiation. Radiation from this source is focused upon the article being inspected, in the illustrated embodiment a sheet of glass 14, by an f/4 plano-convex lens 16 having a focal length of eight inches.

To provide scanning, there is interposed in the optical path between the radiation source 12 and the object 14 to be inspected, a scanning head 18 housed within enclosure 20. The head is comprised of an adjustable stationary mirror 22 and confronting pairs of plane mirrors 24–26 mounted on a rotatable table 28.

Mirror 22, as seen in FIGURE 2, is adjustably secured to a side wall portion 26 of enclosure 20. To permit horizontal adjustment of mirror 20 the side wall is slotted at 30. The position of the mirror may be adjusted by loosening cap screw 32 thereby freeing the serrated lock washer 34 to which the mirror retaining bracket 36 is secured. Mirrors 24 are also adjustable and are arranged for movement in a radial direction by means of the construction shown in FIGURE 3. Mirrors 24 are each carried by a bracket 38 secured to clamp-forming members 40 and 42 by screw 44 threadably engaged in nut 46. Tightening of the screw causes the clamping jaws to seize splined wall portions 48 formed in table 28, locking the mirror firmly in place. By loosening screw 44 the carriage 50 is free to move within the splined track permitting radial adjustment of mirror 24.

The beam of radiation emanating from lamp 12 represented by ray 52, is focused by lens 16 onto the adjustable stationary mirror 22 which directs the beam onto the radially adjustable mirror 24. Radiation incident on mirror 24 is in turn deviated by the mirror pair 24–26 onto the article 14 to be scanned. In instances in which the article being inspected is transparent, a mirror 53 may be used to fold the light beam back on itself. The reason for this will become clear as the description proceeds. To provide rapid traverse of the scanning beam, table 26 is rotatably driven by a synchronous motor 54. By using an 1,800 r.p.m. motor and two pairs of mirrors a sweep frequency of 60 cycles per second is obtained. Using this scanning frequency, and a beam of light focused to a spot one eighth inch in diameter, the entire surface of glass plate 14 may be inspected at a feed rate of about thirty-seven and one half feet per minute. By increasing the rotational speed of the motor and the number of opposed pairs of mirrors the rate of traverse may be materially increased. The pane of glass 14 may be rectilinearly advanced across the scanning port 56 either manually or by mechanical means not shown. To insure that the entire lateral surface of the glass is exposed to the scanning beam, the sheet is confined between runways 58, only one of which is shown. The described arrangement provides a scanning beam which remains normal to the scanned surface throughout the period of traverse and thereby insures return of the beam to its precise point of origin.

Flaw detection is achieved by means of the optical system shown in United States Patent 3,370,176, issued February 20, 1968, and assigned to the assignee of the present invention. Briefly described, flaw detection in accordance with the invention of said copending disclosure is achieved by provision of a radiation projection system which, in the absence of a flaw in the optical path, exhibits a zero radiation output. In the presence of a flaw it becomes radiation transmissive. To attain this mode of operation lens 16 is centrally stopped or obturated to outgoing radiation by opacifying the diagonal face 55 of a prism 57 interposed in the optical path between lens 16 and the radiation source 12. The obturating pattern established by this arrangement is projected through the system and is reflected back by mirror 53 onto lens 16. Unless there is defraction of light in the inspection area caused by flaws in the glass sheet 14, no light reaches the central region of lens 16 and no light is reflected by prism 57 or down tube 59 to photocell 60. The photocell transforms radiation reflected by prism 57 into electrical signals for processing by conventional electronic means 63.

For a better understanding of the scanning action provided by the apparatus of the present invention, reference is had to FIGURE 4 which shows a diagrammatic plan view of the scanning system illustrated in FIGURE 1. It will be seen that as the mirrors 24–26 are carried by rotatable table 28 in a counter-clockwise direction into the dashed-line positions 24'–26' the point at which ray 52 intercepts mirror 24 changes. As table 28 rotates the point of interception rides vertically up the surface of the mirror a distance $d$ (see FIGURE 4A). With the mirrors positioned 45° to the vertical this distance is defined by the expression $$d = r(1 - \cos \theta) \qquad (2)$$

where theta is the angular distance traversed by the mirror in a given increment of time and $r$, as defined previously, is the distance from the rotational axis to the point of interception of the incident light with the innermost mirror.

It will be seen that as the point of beam interception moves vertically up the inclined surface of mirror 24 the point at which its reflection strikes mirror 26 also moves upward and horizontally outward a corresponding distance $d$, in effect neutralizing the tendency of the trace 61 to assume an arcuate configuration as the table rotates.

The formulae defining the cartesian coordinates to facilitate analysis of the sacnning trace 61 generated by beam 52 may be derived using the construction shown in FIGURE 5. The axis of rotation of table 28 is taken as the zero reference point of a cartesian coordinate system. As previously noted the geometry is simplified by making the distance from the axis of rotation to the point of reflection on the second mirror 26 equal to unity. Based on this hypothesis the matematical expression defining the $x$ and $y$ coordinates of the ray trace are as follows:

$$x = r + (1 + r - 2r \cos \theta) \cos \theta \qquad (3)$$
$$y = (1 + r - 2r \cos \theta) \sin \theta \qquad (4)$$

Figure 6:
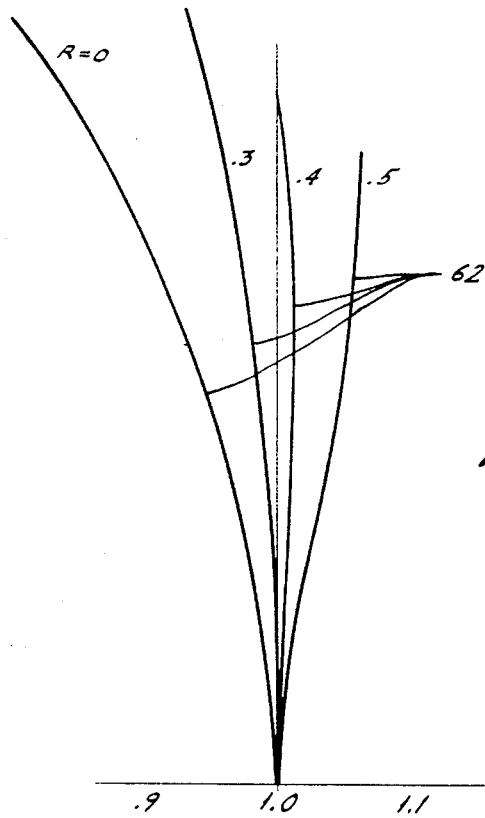
FIGURE 6 is a graph showing variations in scanning trace produced by practice of the invention.

By substituting in these expressions various values of theta and $r$, the family of ray traces 62, shown in FIGURE 6, was established. The value of $r$ is shown adjacent its corresponding ray trace. It will be observed that as mirror 24 is moved from a position of coincidence with the rotational axis "0" to a position approximately three tenths to four tenths the distance to the fixed mirror 26, the trace becomes increasingly more linear. Movement of mirror 22 beyond this region results in diminished linearity. Actual tests with scanning heads of the type illustrated in FIGURE 1 verify these findings.

Where desired the novel method of my invention can be utilized to cause the reflected ray to trace a line of changing configuration. This is readily done by providing any suitable means for varying the spacing between the center of rotation and the inner mirror. For example, a straight-line trace could be acheived by the process of varying the spacing during the scanning operation as by means of a conventional closed cam track disposed in operative relation with a cam follower associated with the mirror carriage 50.

In summary, we have discovered a novel way of linearizing the scan of a rotary scanner, which comprises the step of establishing a critical geometric relationship and spacing between plane reflecting surfaces carried on rotating support structure. By use of such an arrangement a scanning system of optimized sensitivity and fixed focal length is attained with minimal complexity.

While the invention has been illustrated and described in connection with flaw detection apparatus such application is merely exemplary of its use and not limitative thereof. The invention may be used with equal facility, for example, in development of a flying spot scanning raster, or in connection with facsimile reproduction in the conversion of intelligence into video form.

While a particular construction of scanning device has been illustrated, it will be obvious to those skilled in the art that the invention may be applied to a variety of rotary scanners without departing from the principles of operation described herein. Moreover, while the various reflectors have been shown as mirrors, it is obvious that prisms may be substituted for one or all of such reflectors. Although a preferred form of the invention has been depicted and described, it will be understood that the invention is susceptible of changes and modifications without departing from the essential concepts thereof, and that such changes and modifications are contemplated as come within the scope of the appended claims.

We claim:
1. Scanning apparatus comprising: a rotatable member; a pair of planar reflective elements carried by said member for rotation therewith, said elements having reflective surfaces disposed in substantially radial alignment on said member and in angular relation to the plane of rotation thereof, and said surfaces being spaced along a radius of said member and spaced from the rotational axis of the latter; stationary means for focusing a fixed beam of radiation onto one of said surfaces for reflection by the other of said surfaces and means for adjusting the positioning of said elements relative to each other and the rotational axis of said member, whereby radiation reflected from the other of said surfaces produces a substantially linear trace upon rotation of said member.

2. A scanning system comprising a pair of radiation-reflective planar surfaces disposed in spaced confronting relation on support structure; a source of radiation; means for causing relative rotary movement between said source and said surfaces, said radiation being directed substantially normal to the plane of rotary movement, and said surfaces being inclined with respect to said plane, in reflective alignment with each other and in predetermined spaced relation from the rotational axis of said system and means for adjusting the positioning of said surfaces relative to each other and the rotational axis of said system whereby radiation directed onto one of said surfaces produces a non-circular trace upon reflection thereof by the other of said surface on rotation of said system.

3. Scanning apparatus comprising: a rotary member; a pair of reflectors disposed in spaced confronting radial alignment on said member for rotation therewith and at an angle of substantially 45° to the rotational plane of said member, the innermost one of said reflectors being spaced from the rotational axis of said member a distance approximately one third the distance from said rotational axis to the outermost one of said reflectors; and stationary means for directing a beam of light substantially normal to the rotational plane of said member and onto the innermost one of said reflectors for reflection thereby onto the outermost reflectors whereby there is produced a substantially linear trace on rotation of said member.

References Cited

UNITED STATES PATENTS

| 3,062,965 | 11/1962 | Sick | 250—236 |
| 3,081,665 | 3/1963 | Griss et al. | |
| 3,370,176 | 2/1968 | Ett et al. | |
| 2,446,628 | 8/1948 | Brown | 250—209 X |
| 2,750,443 | 6/1956 | Nyman | 178— |

FOREIGN PATENTS

| 348,139 | 5/1931 | Great Britain. |
| 362,208 | 12/1931 | Great Britain. |
| 860,072 | 1/1941 | France. |
| 398,247 | 9/1933 | Great Britain. |

OTHER REFERENCES

Rutter, "Spiral Disc Scanner," IBM Technical Disclosure Bulletin, vol. 5, No. 4, September 1962, p. 57.

DAVID SCHONBERG, Primary Examiner.

PAUL R. GILLIAM, Assistant Examiner.

U.S. Cl. X.R.

178—7.6; 250—219